United States Patent [19]

Horak

[11] 4,436,144
[45] Mar. 13, 1984

[54] PRISMATIC BRICK OF REFRACTORY MATERIAL

[75] Inventor: Josef Horak, Vienna, Austria

[73] Assignee: Veitscher Magnesitwerke-Actien-Gesellschaft, Vienna, Austria

[21] Appl. No.: 346,225

[22] Filed: Feb. 5, 1982

Related U.S. Application Data

[63] Continuation of Ser. No. 119,796, Feb. 8, 1980, abandoned.

[30] Foreign Application Priority Data

Feb. 20, 1979 [AT] Austria .................................. 1302/79

[51] Int. Cl.³ .......................................... F28D 17/00
[52] U.S. Cl. ..................................... 165/9.1; 165/9.2
[58] Field of Search ................................ 165/9.1, 9.2

[56] References Cited

U.S. PATENT DOCUMENTS

| | | | |
|---|---|---|---|
| 1,771,286 | 7/1930 | Brassert et al. | 165/9.2 |
| 2,013,511 | 9/1935 | Steinbacher | 165/9.1 X |
| 2,577,170 | 12/1951 | Walters | 165/9.1 |
| 3,326,541 | 6/1967 | Davies et al. | 165/9.2 |

FOREIGN PATENT DOCUMENTS

| | | | |
|---|---|---|---|
| 266932 | 3/1927 | United Kingdom | 165/9.2 |
| 667448 | 2/1952 | United Kingdom | 165/9.1 |

*Primary Examiner*—Albert W. Davis, Jr.
*Attorney, Agent, or Firm*—Kurt Kelman

[57] ABSTRACT

A grid lining of chambers of a glass melting furnace comprises a plurality of refractory bricks, each brick having a bottom surface, a top surface, a longitudinal axis extending between the surfaces, a through passage of tetragonal cross-section coaxial with the longitudinal axis, the passage having a hydraulic diameter of 120 to 200 mm, the hydraulic diameter being defined by the relationship: four times the passage cross-section divided by the periphery of the passage cross-section, and the ratio of the hydraulic diameter to the wall thickness of the brick, as measured in the direction of the main axes extending parallel to the bottom and/or top surface between 3 and 5.

2 Claims, 3 Drawing Figures

PRISMATIC BRICK OF REFRACTORY MATERIAL

This application is a continuation of application Ser. No. 119,796, filed Feb. 8, 1980, now abandoned.

The invention relates to a checkerwork of prismatic bricks of refractory material, such as for example magnesite, magnesia chrome iron ore or chrome iron ore magnesia, forsterite and fireclay, for chambers of a glass melting furnace.

Generally flat bricks of refractory material, which are stacked one upon the other in a criss-cross arrangement and in an upright, on-edge position, have been used hitherto for building the checkerwork in chambers of glass melting furnaces which are usually heated in an alternate operating mode. This arrangement of bricks results in the formation of vertically extending passages through which passes alternately a flow of waste gases from the firing equipment used for heating the molten bath in the trough of the furnace, such flow of waste gases thus heating the bricks, or a flow of fresh air which is thus pre-heated by the bricks.

Due to their simple form, such bricks are easy to produce and also easy to store. However, due to their relatively large width which in turn is required in order to achieve the necessary degree of stability, such bricks are of relatively large volume relative to their surface area, which is detrimental with regard to making good use of the heat of the waste gases, and in addition, results in a serious curtailment of the service life of the bricks, because of the considerable temperature differences which occur across the width of the bricks.

Furthermore, cross-shaped bricks have also been proposed for the above-mentioned purpose, comprising limb portions which are of relatively narrow dimension, as the necessary degree of stability is provided by the configuration of the bricks. This brick did in fact make it possible to achieve an improved degree of utilisation of the heat in the waste gases. It will be appreciated, however, that T-shaped and L-shaped bricks are also required in order to build the checkerwork, which complicates the manufacture and storage of the bricks.

In addition, constructing the checkerwork is substantially more complicated than when using flat bricks. A further disadvantage of these bricks is that, due to their cross-sectional shape, they have regions of substantially greater wall thickness, in which the problems which have already been described above in relation to flat bricks occur and which result in the service life of the bricks being reduced, by virtue of the internal stresses which occur in those regions of the bricks.

The aim of the present invention is a brick which is very simple in manufacture and storage and which ensures a high degree of utilisation of the heat energy contained in the waste gases. In addition, the invention seeks to provide a brick which permits the grid lining of the chambers of a glass melting furnace to be of a simple and uncomplicated construction.

According to the invention, this is achieved with a brick which has a—preferably octagonal—bottom and top surface and a through passage of tetragonal cross-section coaxial with the longitudinal axis of the brick, wherein the hydraulic diameter of the passage, which defined by the relationship: four times the passage cross-section divided by the periphery of the passage cross-section, is from 120 to 200 mm, and the ratio of the hydraulic diameter to the wall thickness of the brick, as measured in the direction of the main axes which extend parallel to the bottom and/or top surface is between 3 and 5.

The selected shape of the brick provides both for a simple, uncomplicated structure in respect of the checkerwork, and also ensures ease of manufacture of the bricks. In addition, severe fluctuations in the wall thickness, as occur in the case of the previously known cross bricks, are avoided, so that premature destruction of the bricks due to internal stresses is eliminated.

Complying with the specified parameters results in the optimum wall thickness for the brick, relative to the size thereof, to ensure that the heat of the waste gases is utilised to a very good degree and that the brick has the required robustness.

A further feature according to the invention provides that the passage through the brick has rounded corners, whereas the outer periphery of the cross-section of the brick has sharp corners. This configuration eliminates notch stresses in the bricks and, in addition, when the bricks are set in an offset or staggered arrangement, that is to say, when a respective brick is placed on four bricks therebeneath, the above-indicated configuration provides that the corner regions of the vertical passages which are formed by the manner of stacking the bricks have projections projecting into the passages, which projections are produced by the configuration of the corners of the bricks. This arrangement thus prevents a laminar flow through the passages and results in a turbulent flow which is advantageous with regard to good heat transfer from the gas to the brick and vice-versa.

The invention will now be described in greater detail with reference to the drawings, in which.

Figure 1:
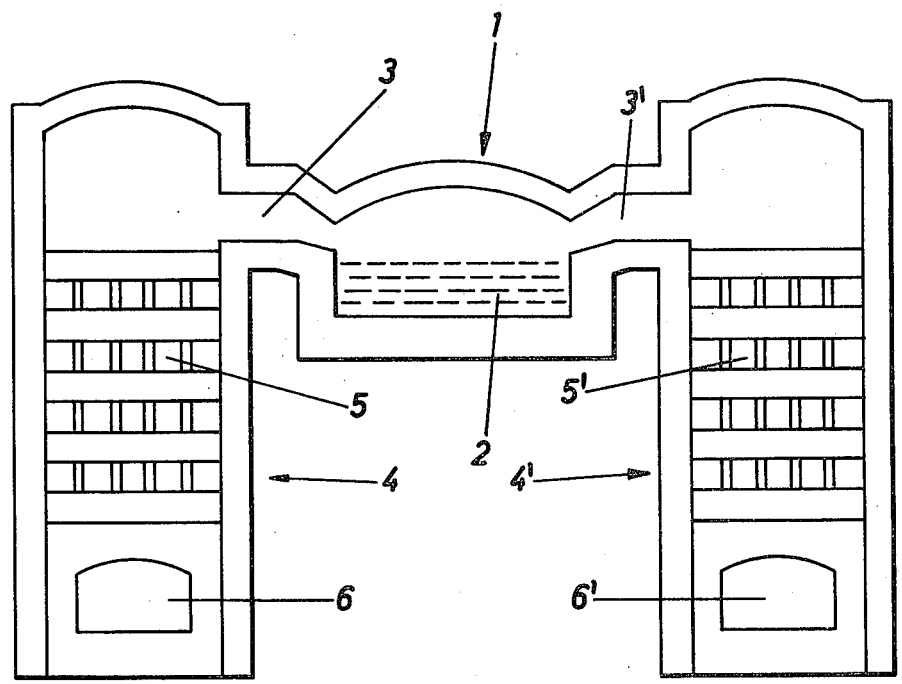
FIG. 1 is a diagrammatic view of a glass melting furnace.

Referring to FIG. 1, reference numeral 1 denotes the trough which contains the molten bath 2 and which is clad with refractory material. At both sides of the trough 1, passages 3 and 3' in which burners (not shown) are arranged lead to the chambers 4 and 4' in each of which is arranged a respective grid or lattice lining 5 and 5'.

In operation, the trough 1 and the molten bath 2 is heated by the burner which is arranged in the passage 3', with the waste gases being taken by way of the passage 3 and through the checkerwork 5, thereby heating the bricks of checkerwork 5. When the bricks of the lining 5 have been sufficiently heated, the furnace is switched over in its mode of operation, and the molten bath 2 is heated by means of a burner which is disposed in the passage 3, in which case the combustion air passes into the chamber 4 by way of the opening 6 and flows through checkerwork 5, absorbing heat therefrom, while the waste gases pass into the chamber 4' by way of the passage 3' and issue from the chamber 4' by way of the opening 6' after having flowed through checkerwork 5', where they give off heat to the bricks of checkerwork 5'.

Figure 2:
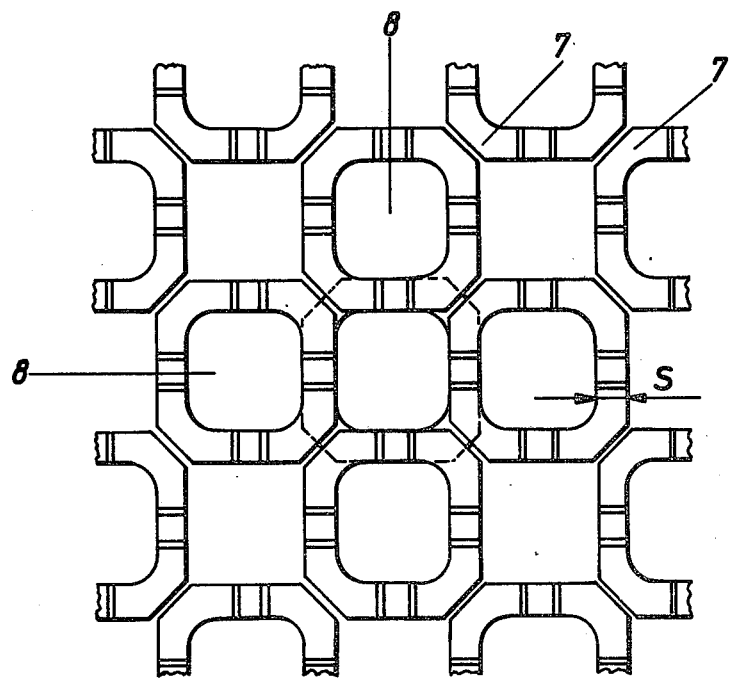
FIG. 2 is a plan view of a layer of a checkerwork with bricks according to the invention.
Figure 3:
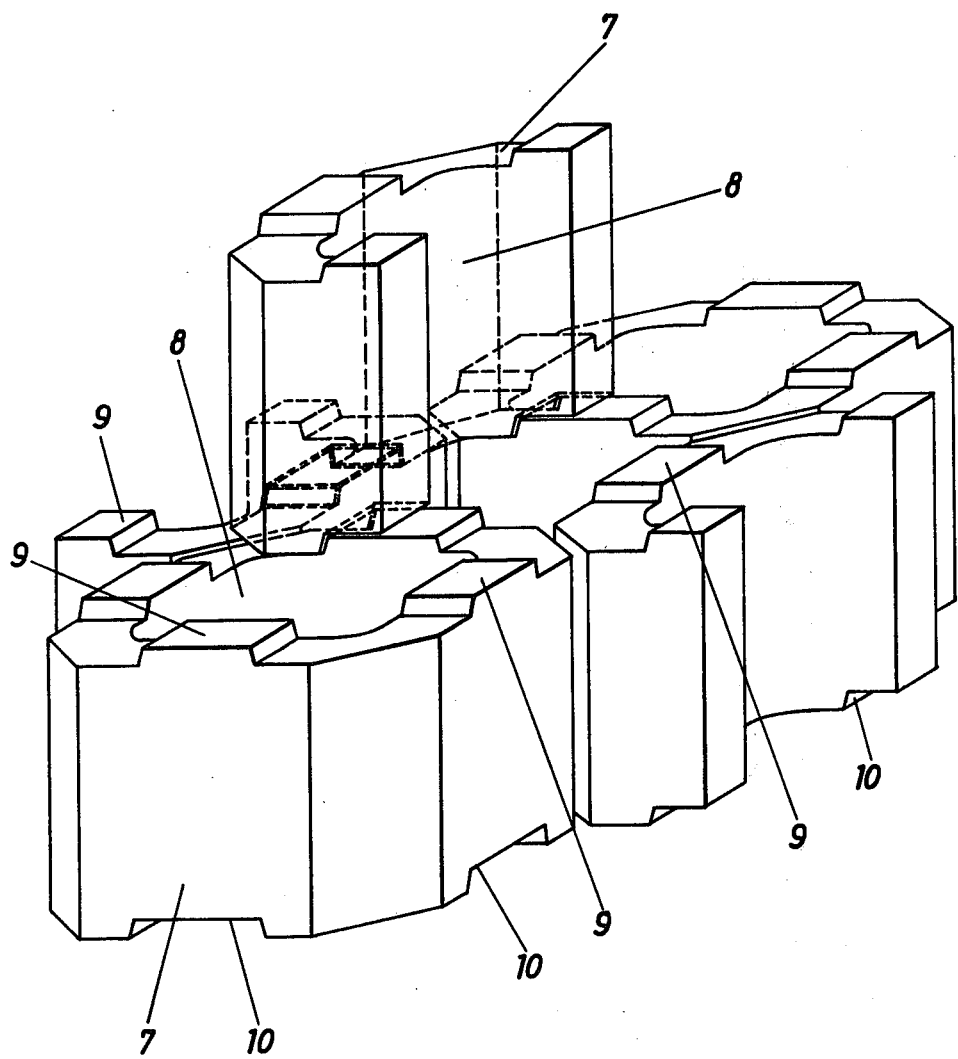
FIG. 3 is a perspective view of a part of a checkerwork with bricks according to the invention.

As can be seen from FIGS. 2 and 3, the bricks 7 according to the invention are of an octagonal outside contour and have a central through passage 8 which is of tetragonal cross-section, and thus correspond to the so-called Brassert bricks. The bricks 7 are of a substantially uniform wall thickness S.

If the bricks 7 are stacked in layers which are offset or staggered relative to each other, the result is vertical passages which are formed in one layer of bricks by the inside surfaces of the passages 8 in the bricks 7 and in the respective next layer by the outside surfaces of four adjoining bricks 7, as shown in broken line in FIG. 2. As the corners of the outer contour of the bricks are sharp, whereas those of the passage 8 in each brick 7 are rounded, the corner regions of the passages which are formed in this way always have sections which project and which are set back, in the vertical direction of the passages, as can be seen from the broken lines in FIG. 2, which indicate the bricks 7 of the next layer of bricks; the projecting and set-back portions in the corner regions of the vertically extending passages result in the formation of a turbulent flow in the passages and thus improve the degree of heat transfer. The projecting and set-back portions can also be seen from FIG. 3 in which only half of some bricks 7 is shown, for the purposes of improved clarity.

In order to facilitate stacking the bricks or building the checkerwork 5, 5', four raised portions 9 are provided at the top surface of each brick 7, the raised portions 9 extending in the direction of the main axes of the top surface, while recesses 10 corresponding to the raised portions 9 are formed in the bottom surface of the bricks.

I claim:

1. A checkerwork for chambers of a glass melting furnace comprised of centrally positioned prismatic bricks of refractory material surrounded by edge and corner bricks, all of the centrally positioned prismatic bricks having a bottom surface, a top surface, a longitudinal axis extending between the surfaces, and a through passage of tetragonal cross-section coaxial with the longitudinal axis, the passage having a hydraulic diameter of 120 to 200 mm, the hydraulic diameter being defined by the relationship: four times the passage cross-section divided by the periphery of the passage cross-section, and the ratio of the hydraulic diameter to the wall thickness of the brick, measured in the direction of the main axes extending parallel to the bottom and/or top surface being between 3 and 5, and the periphery of each brick defining sharp corners and the periphery of the through passage of each brick defining four rounded corners, the bricks being stacked in layers to form the checkerwork and the bricks in each layer being so staggered from the bricks of an adjacent one of the layers that each brick of a respective superposed layer stacked on a respective underlying layer rests on the top surfaces of four bricks of the underlying layer, the four bricks defining therebetween a through passage in alignment with the through passage of the brick of the superposed layer and the rounded corners of the latter through passage projecting inwardly in relation to the former through passage.

2. The grid lining of claim 1, wherein the bottom and top surfaces of the centrally positioned prismatic bricks are octagonal.

* * * * *